Patented Oct. 29, 1929

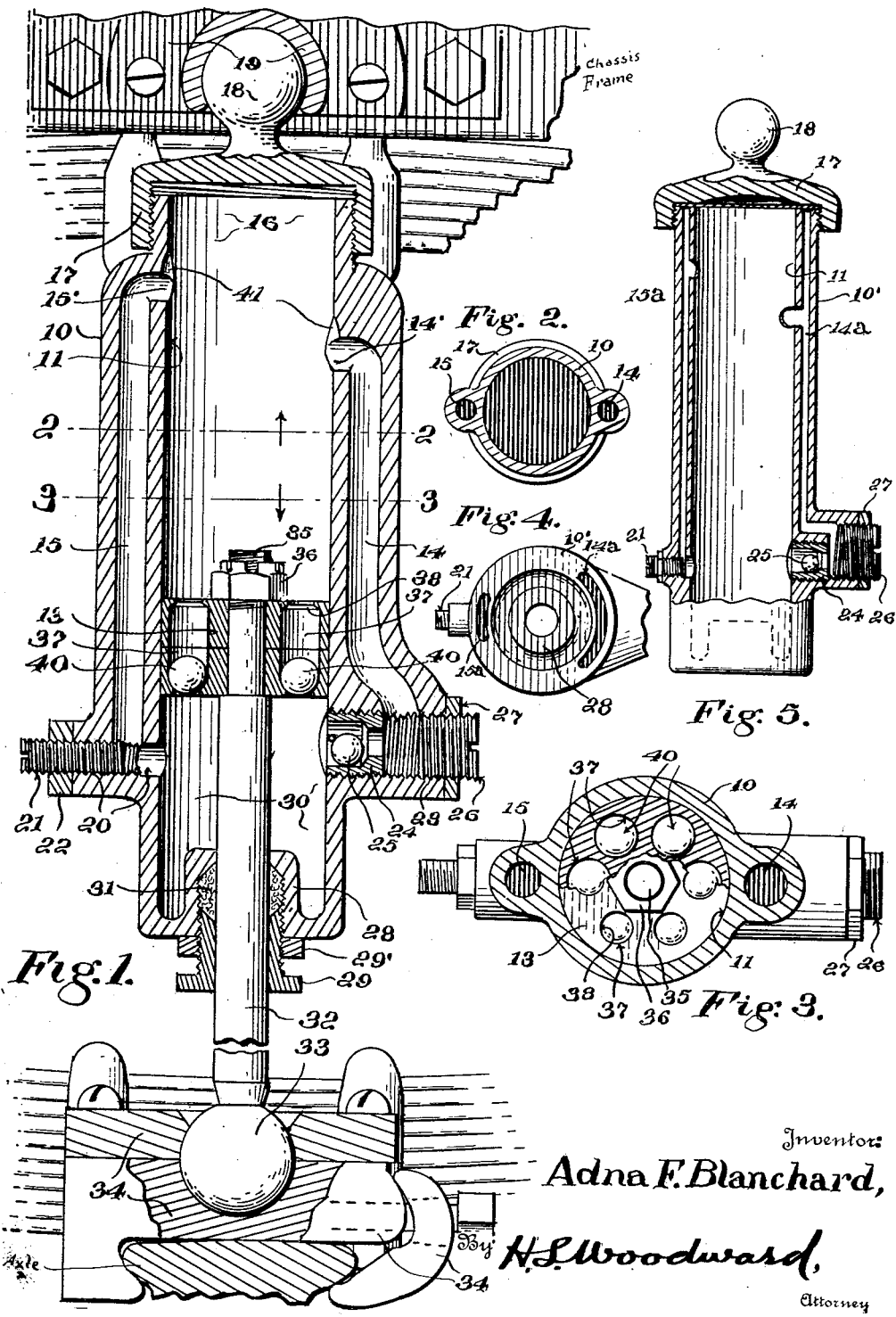

1,733,395

UNITED STATES PATENT OFFICE

ADNA F. BLANCHARD, OF NEW YORK, N. Y., ASSIGNOR TO GUY C. SEATON, OF NEW YORK, N. Y.

HYDRAULIC SHOCK ABSORBER

Application filed October 18, 1926, Serial No. 142,283. Renewed March 26, 1929.

The invention has for an object to present an improved hydraulic shock absorber device suitable for use upon motor vehicles and especially designed to be produced at a low cost, while functioning in an especially efficient manner. It is an important aim to embody a device of this character which will operate as a rebound check or retarder operative with increasing force in the recoil action of a vehicle spring near the extreme of such action, and to also function as a check or retarder to compression forces acting upon a vehicle spring near the extreme of such movement.

It is an important purpose of the invention to enable the accomplishment of the ends in view with a cheap construction, yet without liability of excessive wear, or breakage, and particularly to avoid production of noises incident to operation of the device.

Additional objects, advantages and features of invention reside in the construction, combination and arrangement of parts involved in the embodiment of the invention, as may be more readily understood from the following description, and the accompanying drawings, in which Fig. 1 is a vertical sectional view of the shock absorber.

Fig. 2 is a cross section thereof on the line 2—2 of Fig. 1.

Fig. 3 is a section on the line 3—3 of Fig. 1.

Fig. 4 is a top view of the modified cylinder of Fig. 5.

Fig. 5 is a view similar to Fig. 1 showing a die cast cylinder construction.

There is illustrated a cylinder casting 10 having a smoothly machined bore 11, a piston 13 being fitted in the bore. The casting 10 and the piston may both be formed of cast iron. The showing in Figure 1 represents a simple sand casting, but the device is readily adapted to the use of the die casting process as shown in Figure 5, which will be more particularly described.

Two by-pass passages 14 and 15 are cored in the casting at opposite sides both stopping short of the ends of the casting, which is suitably enlarged around the passages in the simple sand cast article but may be formed within the suitably thickened plain cylindrical wall of the casting when die-cast. The passage 14 at the right of Figure 1 is the main by-pass and opens into the upper end of the bore 11 a material distance inwardly of the corresponding opening of the opposite or two-way by-pass 15, which opens into the upper end of the bore at a distance from the end of the casting sufficient to provide an oil-stop or oil cushion space 16 in the upper part of the bore 11. The extremity of the casting above the two cored passages is cylindrical and exteriorly threaded, being closed by an interiorly threaded cap 17, having a ball 18 formed integrally thereon by which the upper end of the casting may be pivotally mounted in a suitable socket 19 adapted to be bolted to the side of the chassis frame of a motor vehicle. The lower end of the passage 15 is intersected by an interiorly threaded bore 20 opening into the bore 11 from the exterior face of the casting, and by which the passage 15 is put in communication with the lower part of the bore 11. In the outer part of the bore 20 a regulating screw 21 is engaged adapted to restrict more or less the opening from the passage 15 to the bore 11 according to the adjustment of the screw. A lock nut 22 is engaged also on the screw 21 to hold it in adjusted positions.

The passage 14 likewise terminates at its lower end at its intersection with a transverse bore 23 opposed to the bore 20, but being larger in order to accommodate a seat fitting 24 for a ball check valve 25 engaged in the inner part of the bore between the passage 14 and the bore 11, the ball seating outwardly to prevent passage of fluid from the lower part of the bore 11 to the upper part. The outer end of the bore 23 is closed by a screw plug 26 held by lock nut 27. This plug may be utilized to regulate the function of the device in retarding spring-compressing movements of the parts—by which is meant those movements which accompany compression of a spring with which it may be associated after the manner well understood in the art and as will be explained. To accommodate the check valve and its seat the lower end of the passage 14 is offset outwardly as may be seen in Fig. 1. The casting, with the bore 11 is extended a distance below the bores 20 and 23 at which the passages 15 and 14 communicate with the lower part of the bore, and a small packing box 28 is formed within the lower part of the bore 11, but stopping short of the bores 20 and 23 a sufficient distance to form a lower stop space 30 corresponding to the one 16, the uses of both of which will be explained. A gland 29 is fitted in the box 28 from the outside secured by a locknut 29', to compress a packing 31 around a piston rod 32 suitably secured to the piston 13. The outer end of the rod 32 is provided with a ball 33 similar to the one 18, and adapted to be mounted in the same size socket, an axle socket fitting 34 being shown engaged therewith by which the lower end of the rod may be connected to an axle or axle housing. The mountings of the balls 18 and 33 permit universal pivotal movement of the parts connected to the vehicle frame, and to the axle.

The piston body is a plain cylinder bored to receive the tenon 35 of the piston rod therethrough, a nut 36 being screwed on the tenon over the piston and confining the latter tight against the shoulder of the piston at the base of the tenon. In addition a suitable number of smooth bores 37 are formed in the piston each extending entirely through the piston from the upper to the lower face thereof, and located between the piston rod and the periphery of the piston. Each bore 37 has a terminal seat shoulder 38 at each extremity as close to the respective adjacent face of the piston as possible, and in each of these bores there is snugly slidable a ball 40 adapted to seat as a check valve alternatively on both seats. But, incident to their movement from one extreme to the other, a displacement of liquid by the piston is permitted very freely, by which a very important utility is attained in my device. To effect the economical production of the device in this form, I have formed the piston in two similar halves, the division being in a plane at right angles to the axis of the piston. In this manner one gang tool may form in each half the bore for the piston rod tenon and the halves of the bores 37 each including one seat 38. The two halves are held together by their assembly on the piston rod after introduction of the balls into one of the halves.

A liquid consisting of pure sperm oil, or a mixture of alcohol and lubricating oil, or other approved liquid, is introduced into the device so as to completely fill all spaces on both sides of the piston and in the various passages.

In operation, the parts being connected between the axle and the chassis frame immediately thereover, in accordance with familiar practice in the utilization of shock absorbers in motor vehicles, the parts will be approximately in the positions shown in Fig. 1 when the vehicle is light or lightly loaded. Under the slight oscillations of a reciprocatory nature, occurring in the axle relatively to the chassis, due to minor inequalities and undulations of road surfaces encountered by the vehicle, the movement of the piston relative to the cylinder will be practically free of impedance. Thus, initially the balls 40 will all be at the lower ends of the bores 37, and under a slight compression of the vehicle spring the piston will be raised in the bore 11 putting the liquid above under pressure of slight degree, which is immediately relieved by the relief effected through the passage 14, the valve 25 being opened freely; also a slight movement may occur through the passage 15, the liquid moving through both passages passing to the lower part of the bore 11, or theretoward. Upon relief from such compression the piston will move oppositely. At this time the valve 25 will tend to seat and oppose the free relief of liquid from compression in the lower part of the bore 11, so that the benefit of such relief is not obtained in this movement. But the balls 40 are free to move upward, which they do, permitting displacement of oil freely from below the piston until all balls 40 are seated at the upper ends of their bores 37. At the same time there is the same movement of liquid upwardly through the passage 15 as occurred downwardly before. By having the bores 37 in sufficient number and size as well as the balls 40, the necessary free displacement for initial minor flexures of the vehicle spring to be unimpeded is attained.

Upon flexure of the vehicle spring of greater extent than that which is to be unobstructed, the action of the device over a certain range of compression will be similar to the compression action last described, but upon beginning of the reflex action, after a very slight movement unimpeded, due to the action of the balls 40 as last described, these engage their upper seats in the bores 37 and thereafter only the liquid return upwardly through the passage 15 is permitted, as will be understood, and thereby the reflex action is duly retarded. When a very severe compression of the vehicle spring occurs sufficient to move the piston above the port at the upper end of the passage 14, the final compression of the spring will be retarded by reason of the fact that liquid may then only be relieved from compression at the upper part of the bore 11 through the passage 15. The reflex movement will be retarded as before described.

It may be noted that the piston has a range of movement in the bore 11 extending above and below the terminal ports of the passages 14 and 15, so that should the piston extend beyond the outermost port in either direction, it would engage and be resisted by the liquid in the spaces 16 or 30, as the case might be. It is an important function of the balls 40 in the piston, to obviate the excessive lagging of the piston in returning from the spaces 16 or 30, which the balls will do in both instances, as they would be at the ends of the bores 37 distant from the end of the cylinder which the piston approaches, and upon development of forces tending to return the piston, free movement of the piston from the end of the cylinder will be permitted for a short distance by the yielding of the balls to liquid pressure at the inner side of the piston, and movement of the balls to their opposite limits in the bores 37.

It may be found desirable to form the ports 14' and 15' from the upper ends of the passages 14 and 15 in to the bore 11 with slight extensions 41 whereby the cut off of liquid flow thereto in each instance will be made less abrupt.

As shown in Fig. 5, the passages 14$^a$ and 15$^a$ corresponding to those 14 and 15 before described are formed in the wall of the casting in rectilinear form, openings from these passages on to the upper part of the bore in positions corresponding to those of the upper ends of the passages 14 and 15 being formed by a suitable tool, or otherwise.

What is claimed:

1. A shock absorber comprising a chambered casing having a by-pass conduit forming communication between its end portions but opening on the chamber short of the ends thereof, adjustable means to restrict the flow of liquid therethrough, said casing having a second by-pass conduit forming communication between the end portions of the chamber with one end of the conduit opening at the same distance from the end of the chamber as the adjacent end of the other conduit, but the other end of the second conduit opening into the chamber a substantial distance inwardly of the adjacent end of the first named conduit, a check valve to oppose flow of liquid through the second conduit toward the last named end thereof, a piston reciprocable in the chamber, a rod extended therefrom through the end of the casing, and means to connect the casing and rod to respective relatively movable elements.

2. The structure of claim 1 in which a number of passages having seats at each end are formed through the piston, and a member snugly slidable therein between the seats.

3. A piston for liquid-responsive shock absorbers having a plurality of passages therethrough the cubical content of which represents a substantial part of the quantity of liquid displaced by the piston in initial movements of predetermined extent, a reciprocable member snugly slidable in each, and means to stop the reciprocable member at opposite limits of their movement in the passages.

4. A piston for shock absorbers of the character described, comprising a pair of similar cylindrical members secured together end to end, and having like series of passages therethrough, those in one member being alined with those in the other, and having seats at their outer ends, balls interposed between the seats within the passages, and means to secure the members together.

5. A shock absorber comprising a cast casing having a smooth bore therein opening on one end, and being integrally closed at the other end, a packing box being formed in the last named end, a piston in the bore, a rod extended therefrom through the packing box, a packing device around the rod in the box, a closure cap for the open end of the cylinder having a ball integrally connected therewith, said rod having a ball at its extremity, a by-pass passage being formed in the wall of the casing opening on the bore at each end, one opening of the by-pass stopping short of the packing box and the other stopping short of the said cap to permit movement of a substantial part of the piston beyond said openings at times, and a second by-pass passage being formed in the wall of the casing opening at its ends on respective end portions of the bore, at one end spaced equally from the end of the casing with the adjacent opening of the first passage, but at the other end opening into said bore a substantially greater distance from the end of the casing than the adjacent opening of the first named passage.

In testimony whereof I affix my signature.

ADNA F. BLANCHARD.